(12) United States Patent
Cardinal et al.

(10) Patent No.: US 7,839,024 B2
(45) Date of Patent: Nov. 23, 2010

(54) INTRA-AREA MASTER REACTIVE CONTROLLER FOR TIGHTLY COUPLED WINDFARMS

(75) Inventors: Mark E. Cardinal, Altamont, NY (US); Nicholas W. Miller, Delmar, NY (US); Kara Clark, Glenville, NY (US)

(73) Assignee: General Electric Company, Schenectady, NY (US)

( * ) Notice: Subject to any disclaimer, the term of this patent is extended or adjusted under 35 U.S.C. 154(b) by 294 days.

(21) Appl. No.: 12/181,658

(22) Filed: Jul. 29, 2008

(65) Prior Publication Data

US 2010/0025994 A1 Feb. 4, 2010

(51) Int. Cl.
*H02J 3/38* (2006.01)
*H02P 9/00* (2006.01)
(52) U.S. Cl. ............................ 307/84; 307/47; 307/153
(58) Field of Classification Search ................ 307/47, 307/84, 153
See application file for complete search history.

(56) References Cited

U.S. PATENT DOCUMENTS

| | | | |
|---|---|---|---|
| 6,965,174 B2 | 11/2005 | Wobben | |
| 7,119,456 B2 | 10/2006 | Rouleau | |
| 7,166,928 B2 | 1/2007 | Larsen | |
| 7,224,081 B2 | 5/2007 | Larsen | |
| 7,245,037 B2 | 7/2007 | Angquist et al. | |
| 7,312,537 B1 | 12/2007 | Walling | |
| 7,345,373 B2 | 3/2008 | Delmerico et al. | |
| 7,372,173 B2* | 5/2008 | Lutze et al. | 290/44 |
| 7,505,833 B2* | 3/2009 | Delmerico et al. | 700/291 |
| 2007/0047163 A1 | 3/2007 | Lutze et al. | |
| 2007/0124025 A1* | 5/2007 | Schram et al. | 700/287 |

* cited by examiner

*Primary Examiner*—Hal I Kaplan
(74) *Attorney, Agent, or Firm*—Edward J. Smith; Ernest G. Cusick; Frank A. Landgraff

(57) ABSTRACT

A wind turbine generator control system is provided for controlling output of a plurality of tightly-coupled windfarms connected at a point of common coupling with a power system grid. A master reactive control device employs algorithms whose technical effect is to coordinate the real power, reactive power and voltage output of the multiple windfarms. The controller incorporates a reactive power regulator that can be used to regulate reactive power, power factor or voltage at the point of common coupling and an active power regulator that can be used to regulate real power at the point of common coupling; such that each windfarm is not asked to contribute or violate its own operating capability.

23 Claims, 8 Drawing Sheets

INTRA-AREA MASTER REACTIVE CONTROLLER FOR TIGHTLY COUPLED WINDFARMS

BACKGROUND OF THE INVENTION

The invention relates generally to control of multiple electrical windfarm systems within an electric power system and more specifically to a master controller and method for controlling a plurality of interconnected windfarms at a point of common coupling with the electric power system.

Typically, an electric power system includes a plurality of power generation assets, which are spread over a geographic area. The electric power system also includes systems that consume power (loads) that may also be spread over the geographic area. The electric power system also includes a grid, a network of electric power lines and associated equipment used to transmit and distribute electricity over a geographic area. The infrastructure of the grid, may include, but is not limited to devices for interconnection, control, maintenance, and improvement of the electric power system operation. Typically, the electric power system includes a centralized control system operatively connected to the power generation assets for controlling a power output of each of the power generation assets, for example, using processing logic. The network operator usually operates the centralized control system. The power output of the power generation assets controlled by the centralized control system may include, but is not limited to an amount of electrical power, and a voltage for the electrical power.

The power generation assets may include individual power generating stations. The power generating station, may for example, each serve a geographic region within the grid by delivering electrical power to such regions. The power generation assets may each include any type of power source. For example, the power generation assets may include a power source that generates electrical power at least partially from coal; hydro; a combustible fluid such as gasoline, natural gas, diesel fuel, etc.; and from nuclear, wind, and solar energy.

Wind energy is often used to generate electrical power at power plants, often referred to as windfarms, using, for example, the rotation of large wind turbines to drive electrical generators. Windfarms and their associated windfarm controllers can control reactive power supply, and to a more limited extent active power. Larsen, in U.S. Pat. Nos. 7,119,456, 7,166,928, and 7,224,081, describes a voltage control for wind generators including a farm-level controller with a reactive power command and a wind turbine generator control system. Wind turbine generator voltage control may be provided by regulating the voltage according to a reference set by a higher-than-generator-level (substation or farm level) controller. Reactive power may be regulated over a longer term (e.g. few seconds) while wind turbine generator terminal voltage is regulated over a shorter term (e.g. fraction of a second) to mitigate the effect of fast grid transients.

For economic reasons and as one of the approaches to reduce the environmental impacts of fossil fuel power generation, wind turbine generators with larger power output are being produced and windfarms with greater numbers of wind turbine generators are being brought into operation. The power output from the windfarms in the future may comprise a significantly larger part of the total power being supplied and transmitted along the transmission grid. Often, an original windfarm may be sited at a certain geographic location, based on desirable wind conditions at that location. Later, one or more additional windfarms may be sited at the same geographic area, based on the desirable wind conditions that motivated the first windfarm. The later windfarms may be built by the same operator as the first windfarm or by completely different operators. The outputs from windfarms may be interconnected in a variety of points, which are ultimately tied together at a point of common coupling. The point of common coupling may also be the point of connection to the electric power system grid. The point of common coupling may provide a location for measurement of combined output parameters from the plurality of interconnected windfarms. Alternatively, the point of common coupling may be remote from the point of interconnection with grid. Often it is desirable to regulate the combined power-related output from multiple windfarms at the location of measurement. However, at other times it may be desirable or necessary to regulate the combined power-related output from multiple windfarms at a point of regulation distant from the location at which the combined parameters may be measured, for example at the point of interconnection with the grid.

FIG. 1 illustrates a plurality of local windfarms 10, 15, 20 (three windfarms are shown, but any number of local windfarms may be tied together) each with a local windfarm controller 60, interconnected with each other at a point of common coupling 25. The point of common coupling 25 may be at the same point of the physical connection 27 an electrical power system grid 30. For each local windfarm 10, 15, 20, one individual wind turbine generator 35 is shown, representing multiple wind turbine generators usually present in a local windfarm. Each individual wind turbine generator 35 of a local windfarm may be connected through an output transformer 40 to a common bus 45 for the local windfarm, and then through a windfarm transformer 50 to interconnecting lines 55 between the plurality of local windfarms. The local windfarm controller 60 may be operatively connected to the individual wind turbine generator 35 to provide commands 61 for control of power-related parameters. The local windfarm controller 60 may also receive operational status signals 62 from the wind turbine generators and sense power-related output parameters 63 at an output measurement point 65 for the local windfarm 10, 15, 20.

The interconnection of the windfarms may be in different configurations. The distances between the windfarms may vary. The number of wind turbine generators in the individual windfarms may be different. Further, the point of physical connection with the grid may be remote from any of the individual windfarms and the point of common coupling.

As previously described, the centralized control system is operatively connected to the power generation assets for controlling power output parameters. In the case of the plurality of interconnected windfarms with individual local windfarm controllers, individual local power-related commands may be provided to the individual local windfarm controllers from the central control system. Typically, the power-related commands provided to the local windfarm controller may direct the local windfarm controller to provide a specific power-related output at the point of common connection. However, the plurality of individual local windfarm controllers cannot control at the point of common coupling 25 because the power-related parameters at that point are a combination of the outputs from all of the individual windfarms. Typically such problems have been side stepped by reducing regulating requirements, or constraining operation.

Consideration has been given to tuning the individual wind farms to be less dynamic in a way that naturally minimizes interactions. This approach may often reduce the regulation quality and may not ultimately meet the requirements for the power system interconnect standards. Every windfarm could also be instrumented to monitor the output from every other windfarms, as well as the point of interconnect, and derive its own contribution required to regulate the point of interconnect quantities. This solution is a more expensive approach, requiring extra measurement instrumentation and control complexity, such that the complexity makes it difficult to apply.

Accordingly, there is a need to provide a structure and method for controlling a plurality of interconnected windfarms, each operating with a local windfarm controller and jointly providing power-related parameters at a point of common connection with the grid of an electric power system.

BRIEF DESCRIPTION OF THE INVENTION

According to a first aspect of the present invention, a wind turbine generator control system is adapted for controlling output of a plurality of tightly-coupled local windfarms connected at a point of common connection and tied to a power grid wherein each local windfarm includes a plurality of wind turbine generators. The wind turbine generator control system may include a local windfarm controller for each of the plurality of local windfarms, wherein the local windfarm controller controls operation of the plurality of wind turbine generators within the local windfarm, including control for the generation of real power and reactive power for an individual generator of the plurality of wind turbine generators within the voltage and thermal limits of the individual wind turbine generator. A receiving means accepts power-related reference signals from a centralized system controller for the electric power grid and power-related parameters for the operation of the individual local windfarms. A sensing means determines a plurality of power-related parameters at a point of common coupling for the plurality of tightly-coupled windfarms.

A master reactive control device (also known as a master intra-area controller) employs power-related reference signals from the central system controller for the grid, the plurality of sensed power-related parameters from the local controller, and the power-related parameters sensed at the point of common coupling to generate a plurality of power-related commands to each local windfarm controller for the plurality of tightly-coupled local windfarms to command a common power-related parameter at the point common coupling.

According to another aspect of the present invention, a method is provided for operating a wind turbine generator control system, adapted for controlling output by using a master reactive control device of a plurality of tightly-coupled local windfarms, each with a local windfarm controller and a plurality of wind turbine generators, where the local windfarms are connected at a point of common connection, and tied to an electric power grid with a centralized controller. The method includes operating a local windfarm controller for each of the plurality of local windfarms, where the local windfarm controller controls operation of the plurality of wind turbine generators within the local windfarm, including control for the generation of real power and reactive power for an individual generator of the plurality of wind turbine generators within the voltage and thermal limits of the individual wind turbine generator. The method also includes receiving power-related reference signals from the centralized system controller for the electric power grid and receiving a plurality of power-related parameters related to operation of each of the local windfarms. The method further includes sensing a plurality of power-related parameters at a point of common coupling for the plurality of tightly-coupled windfarms. A plurality of power-related commands are generated by a master reactive control device for each local windfarm controller for the plurality of tightly-coupled local windfarms to control a power-related parameter at the point of common coupling for the plurality of tightly-coupled local windfarms.

BRIEF DESCRIPTION OF THE DRAWING

These and other features, aspects, and advantages of the present invention will become better understood when the following detailed description is read with reference to the accompanying drawings in which like characters represent like parts throughout the drawings, wherein.

DETAILED DESCRIPTION OF THE INVENTION

The following embodiments of the present invention have many advantages including regulating the output of tightly-coupled windfarms, connected to a grid of an electrical power system, so as to jointly regulate a single common point of electrical coupling through coordinated real power, reactive power and voltage response. A master reactive control device (MRCD) may monitor a common measurement point for power-related parameters (such as currents, voltage, real power, reactive power and power factor) where the parameter value at the measurement point is an aggregate sum of the contributions for each local windfarm. Line drop compensation may be applied, if necessary, to compensate for real power losses, reactive power losses, and voltage drops that may be required if the measurement point is not at the point in the system at which the combined output of the windfarms is to be regulated. The master reactive control device may incorporate a reactive power output command that can be used to regulate voltage or power factor at the point of common coupling. The MRCD may also incorporate an active power regulator that can be used to regulate real power at the point of common coupling. Real power and reactive power commands to each local windfarm may be controlled such that each windfarm is not asked to contribute or violate its own operating capability. A method for implementing the coordinated control is provided.

Figure 1:
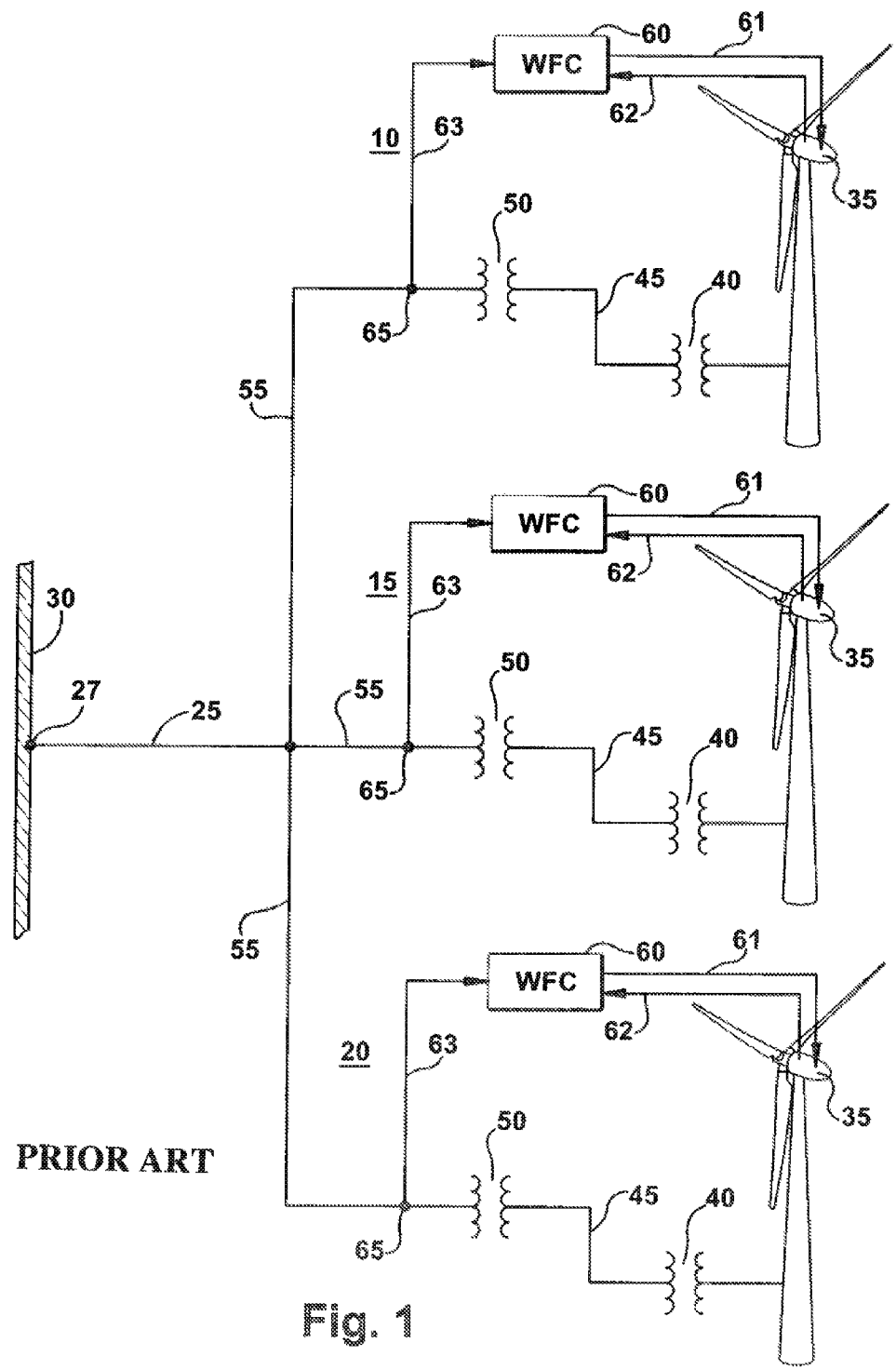
FIG. 1 illustrates a plurality of windfarms, each with a local windfarm controller, interconnected with each other and at a point of common connection with the grid.
Figure 2:
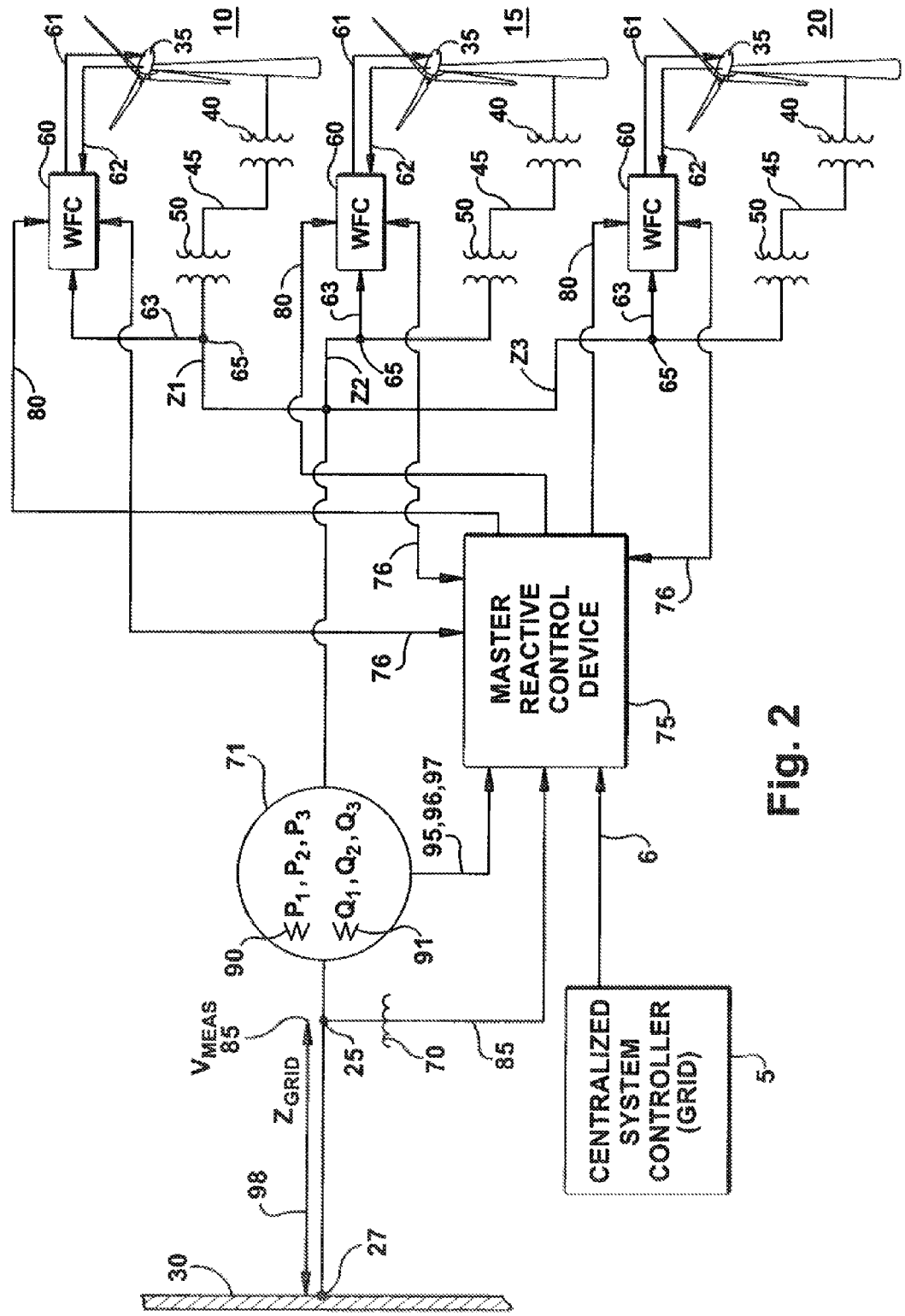
FIG. 2 schematically illustrates a master reactive control device measuring power-related system parameters at a point of common coupling for a plurality of tightly-coupled local windfarms and using the measured parameters to control local windfarm controllers for establishing power-related parameters at the point of common coupling.

FIG. 2 schematically illustrates a master reactive control device adapted to measuring power-related system parameters at a point of common coupling for a plurality of tightly-coupled local windfarms and using the measured parameters to control local windfarm controllers for establishing power-related parameters at the point of common coupling. A first local windfarm 10, a second local windfarm 15, and a third local windfarm 20 may represent a plurality of any number of local windfarms connected at their outputs to a point of common coupling through transmission lines 55, presenting impedances Z1, Z2 and Z3 respectively. Each of the local windfarms 10, 15, 20 is shown with one wind turbine generator 35, which may represent any plurality of wind turbine generators within the local windfarm. Each local windfarm 10, 15, 20 includes a local windfarm controller 60. The local windfarm controller 60 may monitor power-related parameters 63 at the output from the individual local windfarm 65, monitor the operating status 62 of individual wind turbine generators, and provide control signals 61 to the individual wind turbine generators 35 within the respective local windfarm 10, 15, 20.

The grid 30 may typically present an impedance at the point of common coupling to the interconnected windfarms of $Z_{GRID}$, where $Z_{GRID}$ is large in comparison to the impedances Z1, Z2 and Z3 presented by the local windfarms. Consequently, due to the tight coupling of the local windfarms, any individual local windfarm controller trying to respond to a signal from a centralized system controller to provide an output at the point of common coupling 25 would be competing with the other local windfarm controllers and their control signals to implement an output at the point of common coupling.

A plurality of sensing devices 70, 71 at the point of common coupling 25 may sense a plurality of power-related parameters 85, 90, 91 at a point of common coupling 25 (in this case also at the point of measurement 26). The power-related parameters may include real power, reactive power, voltage, line current, and power factor. The power-related parameters may be transmitted 95, 96 to the master reactive control device 75 by various means known in the art. The master reactive control device 75 may use the above-described power-related parameter values, along with other local windfarm power-related parameter signals 76 for controlling 80 the output of the local windfarms 10, 15, 20 based on reference command signals 6 from the centralized' system controller 5.

The master reactive control device 75 may use the power-related parameters to coordinate the individual local windfarms production of watts and vars to regulate system quantities at the point of common connection. The plurality of windfarms may be controlled such that each individual wind farm 10, 15, 20 maintains its own voltage, power and VAR limits in addition to minimizing and eliminating var and voltage oscillations between these closely coupled windfarms. Further, if a point of regulation 27 by the centralized system controller 5 of the electric power system for the interconnected local windfarms is at a location other than the point of measurement 26 for the local windfarms, the master reactive control device 75 for the local windfarms 10,15, 20 may provide compensation for voltage drop and power loss between the point of regulation 27 and the point of measurement 26, utilizing the measured power-related parameters and other line parameters.

Usually the measured power-related parameters, described above, may be measured at the point of common coupling 25, which when used for the measurement of the common output of the individual windfarms may also referred to as point of measurement 26. Alternatively or as a backup to a failed measurement, power-related parameter signals 76 from the local windfarm controller 60 real power, reactive power and current at the point of common coupling may be calculated as a summation of respective real power measurement, reactive power measurements, and current measurements, for each individual local windfarm. Line voltage, at the point of common coupling 25, may be approximated as equivalent to the measured voltage at the output point 65 from any individual local windfarm. The calculated power-related parameters are described in Equations 1-4 below:

$$Pmeas \cong \sum_{i=1}^{n} Pwfi;$$ Equation 1

$$Qmeas \cong \sum_{i=1}^{n} Qwfi;$$ Equation 2

$$Imeas \cong \sum_{i=1}^{n} Iwfi; \text{ and}$$ Equation 3

$$Vmeas \cong Vwfi; \text{ where}$$ Equation 4

$P_{meas}$, $Q_{meas}$, and $I_{meas}$ may be measured values at the point of common coupling and $Pwf_i$, $Qwf_i$, and $Iwf_i$ are the measured values of the parameters at the individual windfarm; and $V_{meas}$ represents a measured value of line voltage at the point of common coupling and $Vwf_i$ are measured values for the line voltage at the output of the individual windfarms; and i represents an index for individual windfarms.

Figure 3:
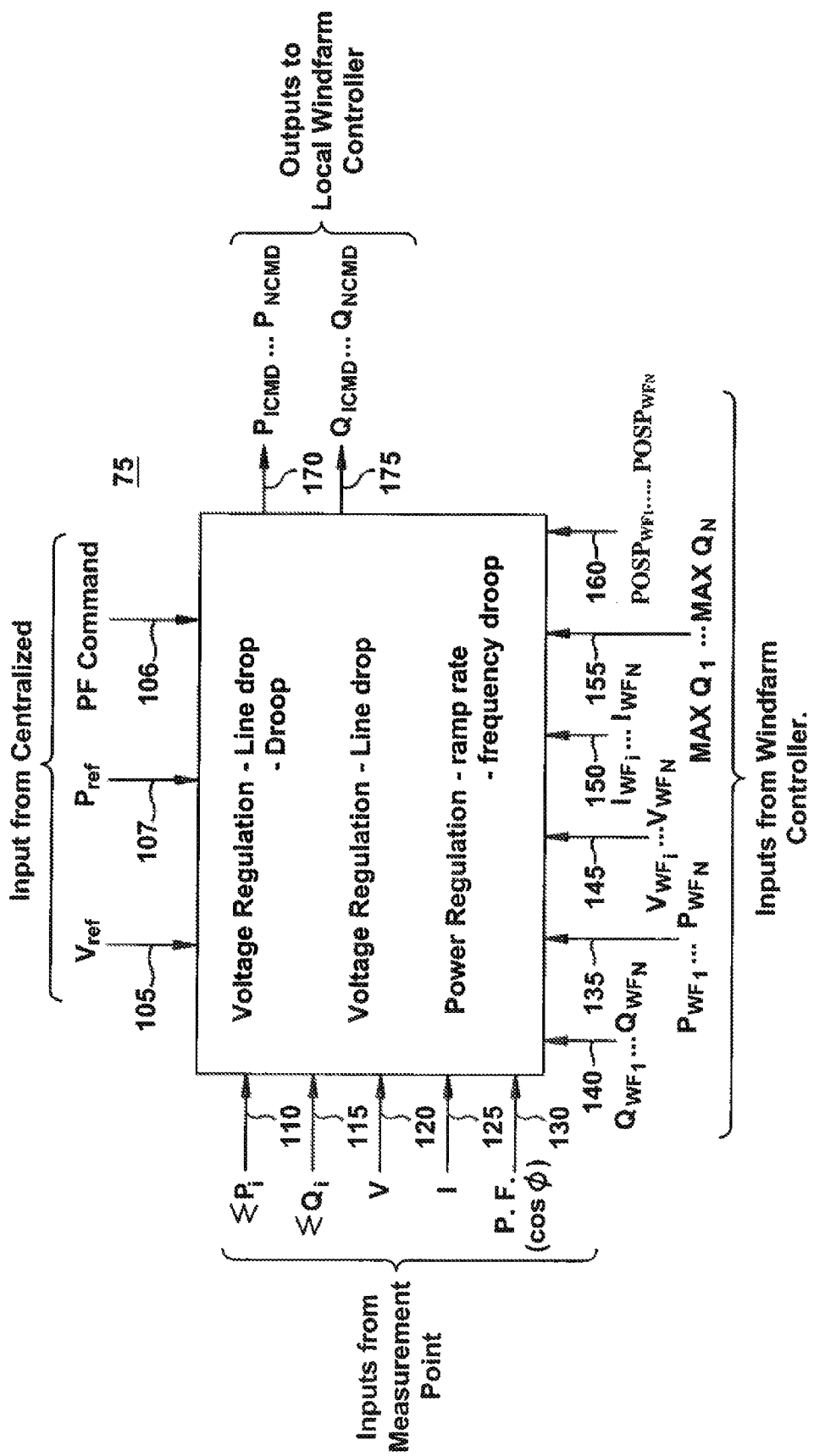
FIG. 3 illustrates input and output parameters that may be employed by the master reactive control device for controlling local windfarm operation.

FIG. 3 illustrates input and output parameters that may be employed by the master reactive control device for controlling local windfarm operation. The MRCD 75 may receive a plurality of control inputs from the centralized system controller 5. The inputs may include, but are not restricted to, reference values for voltage ($V_{ref}$) 105, power factor ($PF_{ref}$) 106 and power ($P_{ref}$) 107 for control at the point of common coupling.

Total real power 110, total reactive power 115, line voltage 120, line current 125 and power factor 130 may be measured at the point of common coupling. Further measured parameters may be provided from the individual windfarms, including real power ($Pwf_1 \ldots Pwf_n$) 135, reactive power ($Qwf_1 \ldots Qwf_n$) 140, output voltage ($Vwf_1 \ldots Vwf_n$) 145, output current ($Iwf_1 \ldots Iwf_n$) 150. Further calculated parameters such as maximum reactive power ($MAXQwf_1 \ldots MAXQwf_n$) 155 and possible maximum real power $POSPwf_1 \ldots POSPwf_n$ 160 may be provided to the master reactive control device from the individual local windfarm controllers. Here, the maximum reactive power 155 for an individual local windfarm may represent the summation of the maximum reactive power capability of individual wind turbine generators and the number of operating wind turbine generators within the local windfarm. The maximum possible real power 160 for an individual local windfarm may represent the summation of the possible real power capability of the individual wind turbine generators under the existing ambient conditions and the number of operating wind turbine generators within the individual local windfarm.

Outputs from the master reactive control device 75 may include real power commands ($P_{1CMD} \ldots P_{nCMD}$) 170 and reactive power commands ($Q_{1CMD} \ldots Q_{nCMD}$) 175 to individual local windfarm controllers. The commands are established according to algorithms, whose technical effect is to provide at least one of voltage regulation, power factor regulation and power regulation at the point of common coupling.

Figure 4:
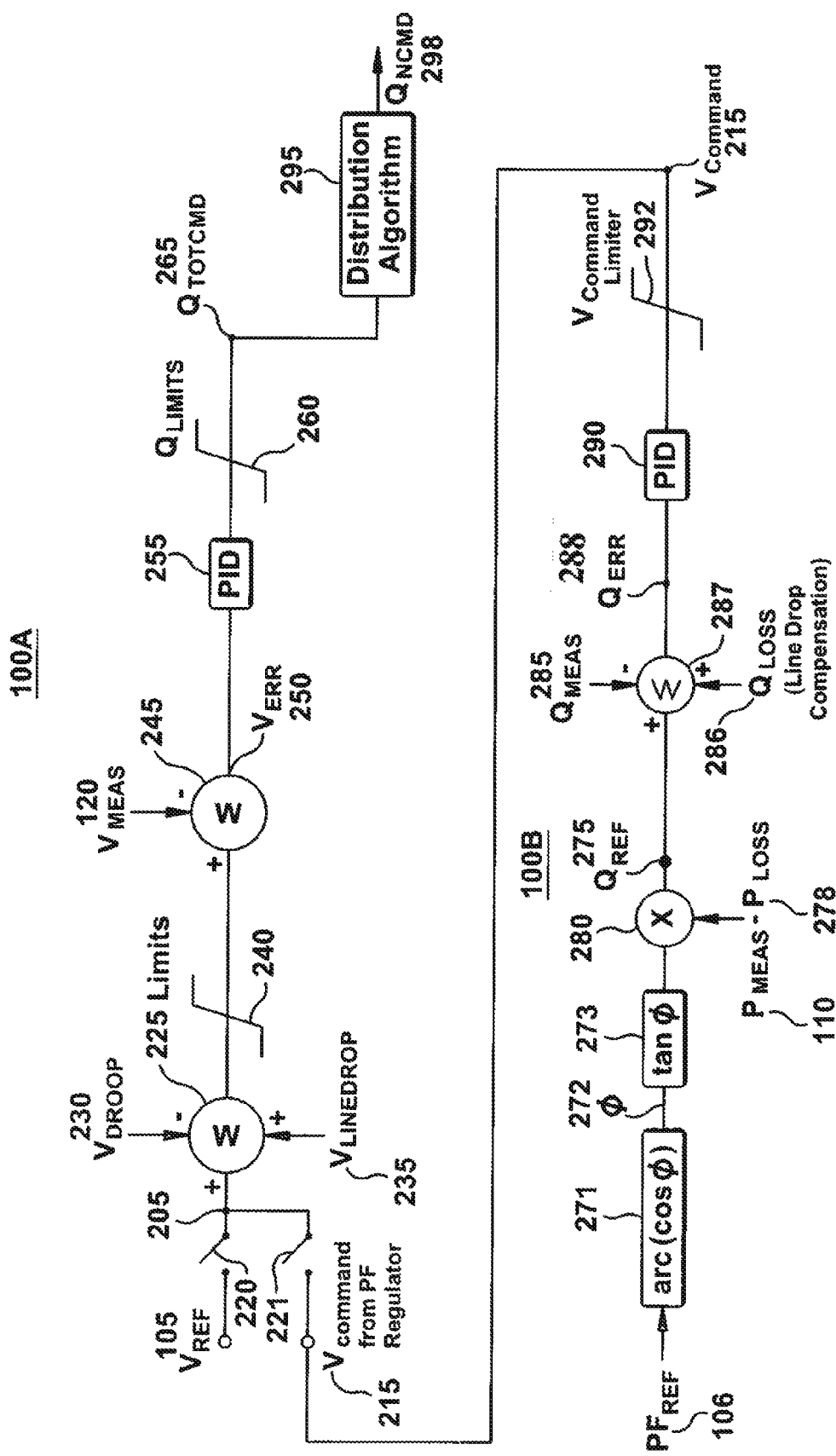
FIG. 4 illustrates a voltage regulator according to one aspect of the present invention wherein a voltage reference is provided to the regulator and a reactive power command is provided at the output.

FIG. 4 illustrates one embodiment of a master reactive control device 75 according to the present invention wherein a voltage reference $V_{REF}$ 105 is provided to a voltage regulator 100A and a windfarm reactive power command 298 is provided at the output. In one aspect, the wind turbine control system is adapted for regulating voltage at a point of common coupling 25 at output of a plurality of tightly-coupled local windfarms 10,15, 20 (FIG. 2). An input voltage reference 205 to the voltage regulator 100A may include a voltage reference input 105 or a power factor voltage command 215 from a power factor regulator 100B (later described), where either input may be alternatively switched into the circuit by switches 220 and 221 respectively, or other suitable means. The input voltage reference 205 may be compared at summer 225 with a voltage droop signal 230 and with a line drop compensation signal $V_{linedrop}$ 235.

The combined signal is tested by limiter 240 to maintain voltage at the local connection point within limits. The combined signal then is compared in summer 245 against $V_{meas}$ 120 to generate voltage error signal $V_{err}$ 250 to be applied to proportional-integral-derivative (PID) controller 255 to generate a total reactive power command $Q_{TOTCMD}$ 265. $Q_{TOTCMD}$ 265 is bounded by Q limiter 260 where $Q_{LIMITS} = \Sigma Q_{LIM1} \ldots Q_{LIMn}$ for the individual windfarms. $Q_{TOTCMD}$ 265 represents the total reactive power being commanded for the plurality of windfarms. Sending reactive power commands to the local windfarms eliminates conflicts between the local windfarm voltage regulators. The total reactive power command $Q_{TOTCMD}$ 265 may then be apportioned as $Q_{nCMD}$ to the individual local windfarms according to a distribution function, to be further described.

It is possible to compensate for line drop 98 (FIG. 2) between the point of measurement 26 (FIG. 2) and the point of regulation 27 (FIG. 2) because the master reactive control device "sees" the combined current flowing from all local windfarms. The line drop may be determined according to Equation 5:

$$V_{LINEDROP} = I^* \times X^* - \frac{(B) \times X^*}{2} \times X^*_{MEAS};$$ Equation 5 where $I^*$ is the phasor current, $V^*_{MEAS}$ is the phasor voltage, $X^*$ is the complex impedance of the compensated line, and B is the line charging term.

$V_{Droop}$ may be calculated according to Equation 6:

$$V_{DROOP} = (\%_{DROOP}) \times \frac{Q_{MEAS}}{Q_{RATED}} \times V;$$ Equation 6 where % Droop is a specified droop value, $Q_{MEAS}$ is the measured reactive power, $Q_{RATED}$ is the rated reactive power, and V is the nominal voltage or reference voltage.

Figure 5:
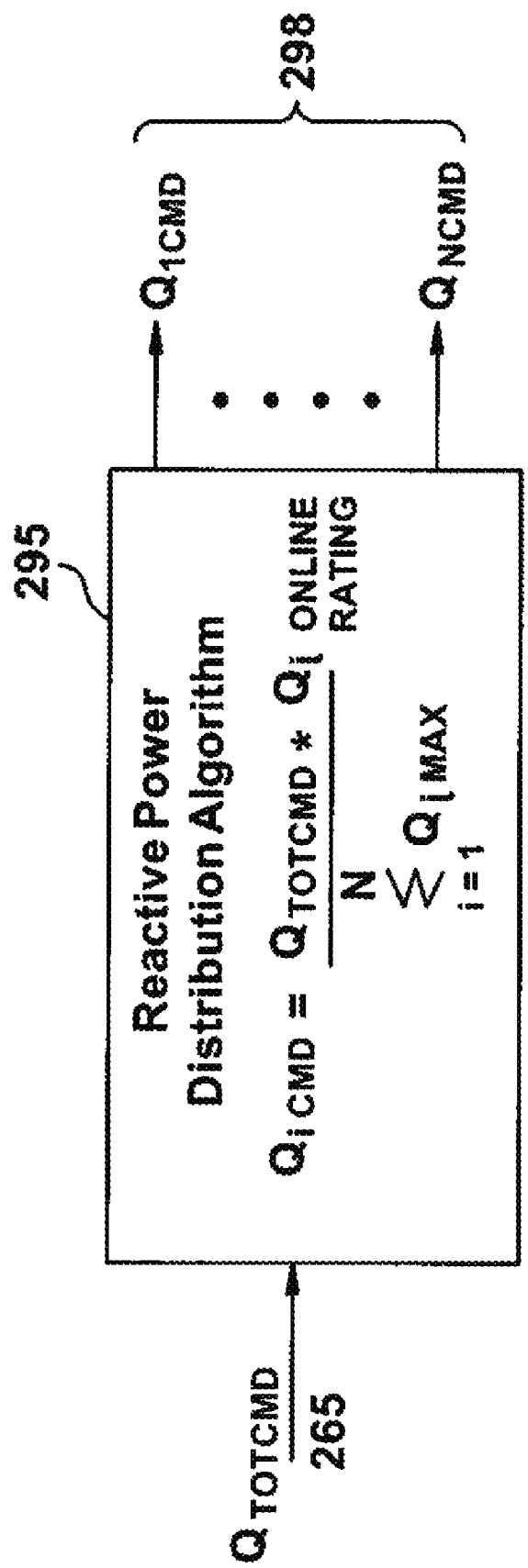
FIG. 5 illustrates a distribution function whereby the total reactive power command developed by the voltage regulator for voltage or power factor control at the point of common coupling may be assigned to the individual local windfarms.

FIG. 5 illustrates a distribution function whereby the $Q_{TOTCMD}$ developed by the voltage regulator for the total reactive power at the point of common coupling may be assigned to the individual local windfarms. From $Q_{TOTCMD}$ 265, a windfarm reactive power command $Q_{1CMD} \ldots Q_{nCMD}$ 298 may be assigned by a distribution algorithm 295 for each local windfarm controller. One embodiment of the distribution algorithm 295, may utilize local maximum online reactive power ratings provided from the individual local windfarm or the individual local windfarm controllers to the master reactive control device 75. The local windfarm or local windfarm controller may generate its local maximum online reactive power rating $Q_{iONLINE}$ rating $\ldots Q_{iONLINE}$ rating 155 (FIG. 3), based on the number of wind turbine generators operating in the local windfarm and the reactive power rating of the individual wind turbine generators. The reactive power command provided to windfarm i, may be described in Equation 7:

$$Qi_{CMD} = \frac{Q_{TOTCMD} \cdot Qi_{ONLINERATING}}{\sum_{n=1}^{N} Qi_{MAX}}.$$ Equation 7

In the event of loss of communication from a windfarm, other algorithms may be employed to distribute the total reactive power commands. In one such embodiment, configuration constants in reactive power units may be applied to distribute such commands as in Equation 8:

$$Qn_{CMD} = \frac{Q_{TOTCMD} \cdot K_i}{\sum_{i=1}^{N} K_i};$$ Equation 8 where $K_i$ is a configuration constant in VARS.

Again referring to FIG. 4, the regulator may receive a power factor voltage command 215 when in the mode of controlling power factor at the point of common coupling, with switch 221 closed. However, the control signal to the regulator is provided in the form of designated power factor reference (cos φ) 106 provided by the central system controller 5 (FIG. 2). The designated power factor reference 106 may be transformed into the power factor voltage command 215 in order to use the regulator controls common to both voltage regulation and power factor regulation. In one embodiment of the transformation, the power factor reference $PF_{REF}$ 106 is converted into a reactive power reference $Q_{REF}$ 275 where arc(cos φ) function 271 outputs φ272 and tan φfunction 273 represents the ratio of reactive power to real power. When multiplied 280 by the real power ($P_{MEAS}$110-$P_{LOSS}$ 278), $Q_{REF}$ 275 is established. $Q_{REF}$ 275 may be compared against $Q_{MEAS}$ 285 at summer 287 to determine a reactive power error signal $Q_{ERR}$ 288. $Q_{ERR}$ 288 may be input to proportional-integral-derivative (PID) controller 290 to generate power factor voltage command $V_{COMMAND}$ 215. Further, upper and lower bounds may be established on $V_{COMMAND}$ 215 by limiter 292 to maintain the signal within bounds for local connection points.

For power factor control at a common system point other than the point of measurement, the line drop compensation may be provided to $P_{MEAS}$ 110 by a calculated real power loss $P_{LOSS}$ 278 and to $Q_{MEAS}$ 285 by a calculated reactive power loss $Q_{LOSS}$ 286. The compensatory power losses are calculated according to Equations 9 and 10:

$$PLOSS = I_{MEAS}^2 \times R$$ Equation 9, and $$QLoss = -I_{MEAS}^2 \times R + V^2 \times B$$ Equation 10;

where $I_{MEAS}$ and $V_{MEAS}$ are measured at the point of common coupling, R is the line resistance between the point of common coupling and the point of regulation, and B is the line charging term.

Figure 6:
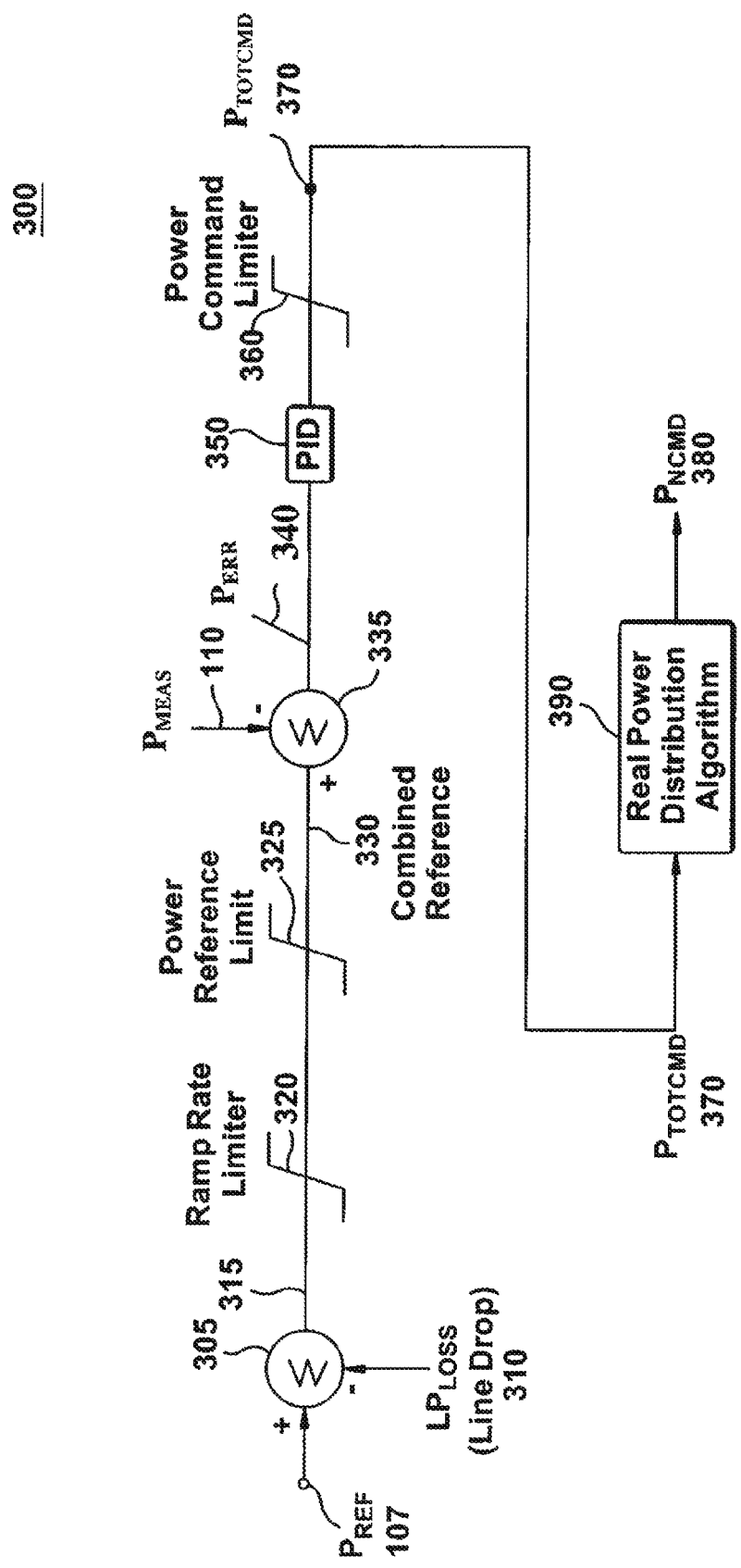
FIG. 6 illustrates a real power regulator according to one aspect of the present invention wherein a real power reference is provided to the regulator and a real power command to the local windfarms is provided at the output.

FIG. 6 illustrates an embodiment of a real power regulator 300 according to a further aspect of the present invention wherein a real power reference 107 is provided to the regulator from the centralized system controller 5 (FIG. 2) and a real power command 380 is provided at the output. In one aspect of the present invention, a wind turbine control system is provided, adapted for regulating real power at a point of common coupling at output of a plurality of tightly-coupled local windfarms. The real power reference 107 may be adjusted at real power reference summer 305 with a line drop compensation signal $P_{LOSS}$ 310 if the point of measurement is different than the point of regulation. The loss-corrected signal 315 may be tested by ramp rate limiter 320 to maintain the rate of power change within upper and lower bounds. The loss-corrected signal 315 may also be tested by power reference limiter 325 to hold the power signal within upper and lower bounds. The combined reference 330 signal then is compared at summer 335 against Pmeas 110 from the point of measurement to generate a real power error signal Perr 340 to be applied to proportional-integral-derivative (PID) controller 350 to generate a total real power command $P_{TOTCMD}$ 370. $P_{TOTCMD}$ 370 represents the total real power being commanded to be supplied by the plurality of local windfarms. $P_{TOTCMD}$ 370 is limited by power command limiter 360. The total real power command $P_{TOTCMD}$ 370 may then be apportioned as $P_{nCMD}$ 380 to the individual local windfarms according to a distribution function, to be further described below.

Figure 7:
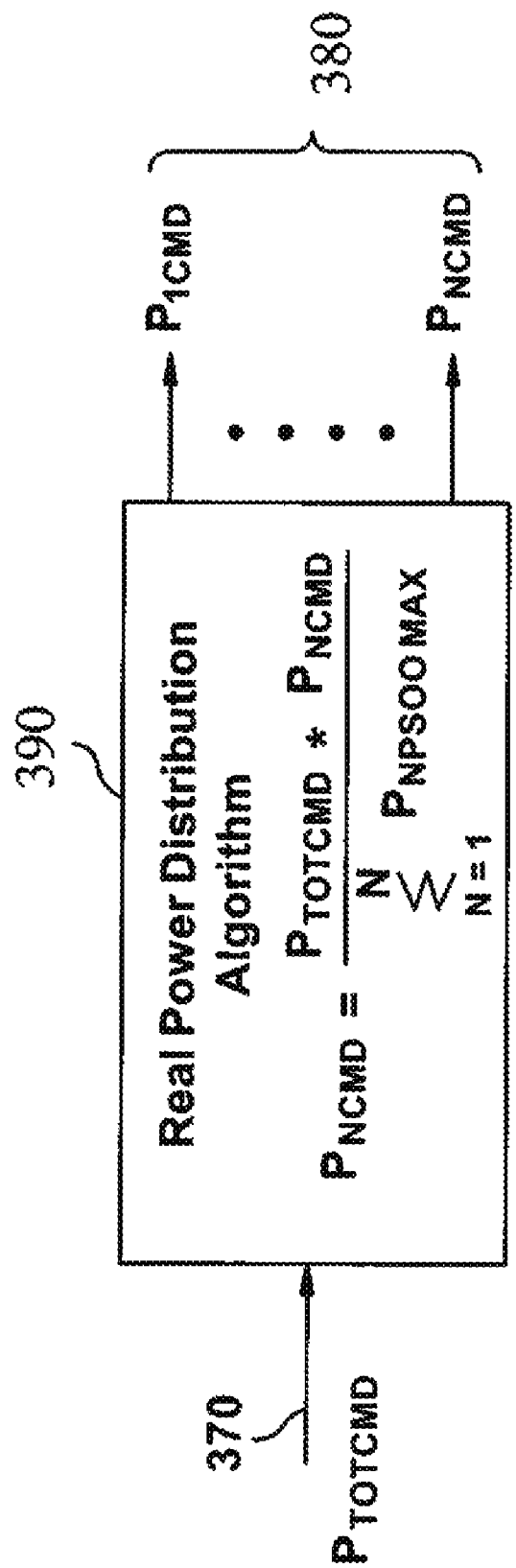
FIG. 7 illustrates a distribution function whereby a total real power command developed by the real power regulator for the total real power at the point of common coupling may be assigned to the individual local windfarms.

FIG. 7 illustrates a distribution function whereby the $P_{TOTCMD}$ 370, developed by the real power regulator 300, for the total power at the point of common coupling may be assigned to the individual local windfarms. From $P_{TOTCMD}$ 370, windfarm real power commands $P_{1CMD} \ldots P_{nCMD}$ 380 may be assigned by a distribution algorithm 390 for each local windfarm controller. One embodiment of the distribution algorithm, may utilize local maximum possible real power ratings provided from the individual local windfarm or the individual local windfarm controllers to the master reactive control device. The local windfarm or local windfarm controller may generate its local maximum possible power rating $P_{1POSS}$ rating $\ldots P_{nPOSS}$ rating 160, based on the number of wind turbine generators operating in the local windfarm and the possible real power capability of the individual wind turbine generators. The real power command provided to windfarm n, may be described in Equation 11:

$$Pn_{CMD} = \frac{P_{TOTCMD} \cdot Pn_{POSS}}{\sum_{n=1}^{N} Pn_{POSSMAX}}. \qquad \text{Equation 11}$$

In the event of loss of communication from a windfarm, other algorithms may be employed to distribute the total reactive power commands. In one such embodiment, configuration constants in reactive power units may be applied to distribute such commands as in Equation 12:

$$Pn_{CMD} = \frac{P_{TOTPOSS} \cdot K_i}{\sum_{i=1}^{N} K_i}; \qquad \text{Equation 12}$$

where $K_i$ is a configuration constant in watts.

According to a further aspect of the present invention, a method is provided for coordinating control of closely-coupled local windfarms connected at a point of common connection with an electric power grid. The method may include receiving power-related reference signals from a centralized system controller for the electric power grid and also receiving power-related operational signals from each of a plurality of local windfarms. The method may also include sensing a plurality of power-related parameters at a point of common connection with grid. According to the reference signals provided from the centralized system controller and the power-related operational signals supplied by the plurality of local windfarms, a plurality of power-related commands are generated for each of the plurality of local windfarms. The plurality of power-related commands are transmitted to each of the plurality of local windfarms for controlling the output of the individual local windfarms to produce a combined output at the point of common coupling, or alternatively at a different point of regulation, according to the power-related reference signals.

The power-related reference signals received from the centralized system controller for the electric power grid may include a reference voltage command, a power factor reference command and a real power reference command.

The power-related signals sensed at the point of common connection may include real power $P_{MEAS}$, reactive power $Q_{MEAS}$, line voltage $V_{MEAS}$, line current $I_{MEAS}$, and power factor $PF_{MEAS}$.

The power related operational signals from the plurality of local windfarms may include real power output reactive power output, voltage output. The current output measured parameters may be provided from the individual windfarms, including real power ($Pwf_1 \ldots Pwf_n$) 135, reactive power ($Qwf_1 \ldots Qwf_n$) 140, output voltage ($Vwf_1 \ldots Vwf_n$) 145, output current ($Iwf_1 \ldots Iwf_n$) 150. Further calculated parameters such as maximum reactive power ($MAXQwf_1 \ldots MAXQwf_n$) 155 and possible maximum real power $POSPwf_1 \ldots POSPwf_n$ 160 may be provided to provided to the master reactive control device 75 from the individual local windfarm controllers.

When the power related parameter is being controlled at a point of regulation other than the point of measurement, line drop compensation may be used. The line-drop compensation may be applied to correct the voltage reference command from the centralized controller as previously described in Equations 5 for voltage regulation control and power factor control. Line drop compensation may be applied as a power loss correction in real power regulation and for establishing the $Q_{REF}$ for power factor regulation as previously described in Equation 9 and 10.

The method may further include controlling a local controller for a non-windfarm power generating source, electrically coupled with the plurality of local windfarms at a point of common coupling 25, according to the output of the master reactive control device 75.

According to a further aspect of the present invention, the method may include generating a total reactive power command for the plurality of local windfarms and a total real power command for the plurality of local windfarms.

According to a further aspect of invention, the method may include regulating voltage and power factor at the point of common coupling. The method may further include generating a total reactive power command and a total real power command as previously described. The method may also include determining, as previously described, a distribution of the total reactive power command to each individual local windfarm according to a distribution algorithm whose technical effect is to distribute the reactive load to windfarm according to the capability of the individual local windfarm to generate reactive power and determining a distribution of the total real power command to each individual local windfarm according to a distribution algorithm whose technical effect is to distribute the real load to each local windfarm according to the capability of the individual local windfarm to produce real power.

Figure 8:
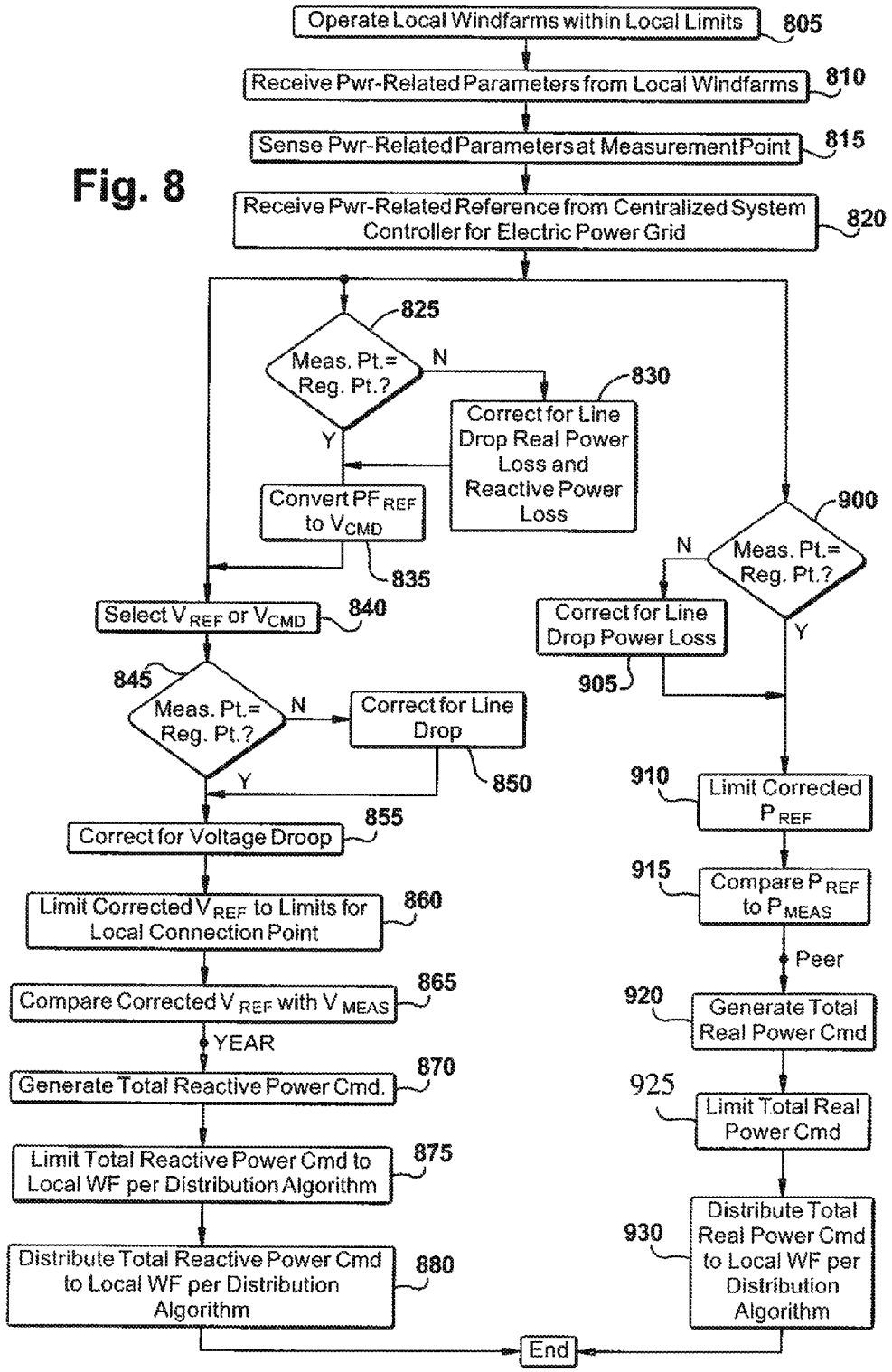
FIG. 8 illustrates a flowchart of a method for operating a wind turbine generator control system with a master reactive control device for controlling the output of a plurality of local windfarms at a point of common connection with the grid of an electric power system.

FIG. 8 illustrates a flowchart of a method for operating a wind turbine generator control system with a master reactive control device for controlling the output of a plurality of local windfarms at a point of common connection with the grid of an electric power system. In step 805 a plurality of interconnected local windfarms are operated under the control of their respective individual local windfarm controllers to generate real power and reactive power outputs within the limits of their respective wind turbine generators. The operation may include interconnected non-windfarm power generating sources. In step 810, the control system (master reactive control device may receive a plurality of power-related parameters from the local windfarms or local windfarm controllers. In step 815, a plurality of power-related parameters may be sensed at a point of measurement at the common coupling of the outputs of the individual local windfarms. If the point of measurement is at a location distant from the point at which the power-related parameters are to be controlled, then line drop compensation for voltage drop, real power loss, and reactive power loss corrections may be applied. In step 820 the method may include receiving a plurality of reference signals for power related parameters from the centralized system controller for the electric power grid to which the local windfarms are interconnected. The power-related reference signals may include a voltage reference signal, a power factor reference signal and a real power reference signal. In step 825, it is determined whether the point of measurement at a point of common coupling is the same as the point at which the power-related parameter is to be regulated. If the point of regulation is different from the point of measurement, then a correction for line drop 830 must be applied in step 835 for converting the PF reference to a voltage command. Otherwise the conversion of the PF reference to the voltage command is carried out in step 835 without a line drop correction.

In step 840, a selection may be made as to whether the voltage reference signal or the PF voltage command is to be used for regulation. In step 845 it is determined if the point of regulation is different from the point of measurement. Then a correction for line drop voltage should be applied in step 850 to the voltage reference. An additional correction may be made in step 855 for voltage droop. In step 860 a limit may be placed on the corrected voltage reference to maintain limits for the local connection points. In step 865, a comparison is made between the corrected reference signal and the measured output voltage to generate an error voltage Verr. In step 870, the voltage error signal is converted in PID controller to a total reactive power output command $Q_{TOTCMD}$. $Q_{TOTCMD}$ may be limited in step 875 to recognize the combined reactive power output of the individual local windfarms. In step 880, the limited $Q_{TOTCMD}$ may be distributed among the individual windfarms according to a distribution algorithm whose technical effect is to limit the reactive power commands to individual windfarms to not exceed the capability according to Equations 7 and 8, as previously described.

Similarly with control of real power, in step 900 it is determined if the point of regulation is different from the point of measurement, in which case, in step 905 a power loss correction is applied for line drop according to Equation 9, as previously described. Limits on ramp rate and power reference may be applied in step 910. A comparison between the limited power reference signal and the measured power Pmeas is made in step 915 to generate a Perr signal. The Perr signal is transformed in step 920 by a PID controller to generate a total real power command $P_{TOTCMD}$. $P_{TOTCMD}$ may be limited in step 925 to recognize the combined real power output capability of the individual local windfarms. In step 930, the limited $P_{TOTCMD}$ may be distributed among the individual windfarms according to a distribution algorithm whose technical effect is to limit the real power commands to individual windfarms to not exceed the capability according to Equations 11 and 12, as previously described.

While various embodiments are described herein, it will be appreciated from the specification that various combinations of elements, variations or improvements therein may be made, and are within the scope of the invention.

The invention claimed is:

1. A wind turbine generator control system, adapted for controlling output of a plurality of tightly-coupled local windfarms connected at a point of common coupling and tied to a power grid wherein each local windfarm includes a plurality of wind turbine generators, comprising:
    a local windfarm controller for each of the plurality of local windfarms, wherein the local windfarm controller controls operation of the plurality of wind turbine generators within the local windfarm, including control for the generation of real power and reactive power for an individual generator of the plurality of wind turbine generators within the voltage and thermal limits of the individual wind turbine generator;
    sensing means for determining a plurality of power-related parameters at a point of common coupling for the plurality of tightly-coupled windfarms;
    receiving means for receiving a plurality of power-related parameters from the output of the individual local windfarms;
    receiving means for receiving a plurality of power-related reference commands from a central system controller for the electric power grid; and
    a master reactive intra-area controller employing at least one of the plurality of sensed power-related parameters adapted for generating a plurality of power-related commands to each individual local windfarm controller for the plurality of tightly-coupled local windfarms.

2. The wind turbine generator control system according to claim 1, further comprising:
    a non-windfarm power generating source electrically coupled with the plurality of windfarms; and
    a local controller for a non-windfarm power generating source electrically coupled with the plurality of windfarms and controlled by the output of the master reactive intra-area controller.

3. The wind turbine generator control system according to claim 1, wherein the power-related commands comprise:
    a total reactive power command for the plurality of tightly-coupled windfarms; and
    a total real power command for the plurality of tightly-coupled windfarms.

4. The wind turbine generator control system according to claim 3, further comprising: line drop compensation using at least one of voltage, current, real power, reactive power and power factor measurements at a point of measurement on a point of common coupling and transmitted to the master reactive intra-area controller to determine the power-related commands.

5. The wind turbine generator control system according to claim 3, wherein the power related commands further comprise:
    a reactive power command to each individual windfarm of the plurality of windfarms, and a real power command to each individual windfarm of the plurality of windfarms, wherein the reactive power command and the real power command are distributed by the master reactive reactive intra-area controller according to at least one distribution algorithm.

6. The wind turbine generator control system according to claim 5, wherein the the master reactive intra-area controller distributes the total reactive power command to each of the individual local windfarms according to an algorithm whose technical effect is to distribute the total reactive power command based on the ratio of an online reactive rating for the individual local windfarm as received by the master reactive intra-area controller from the local windfarm controller to the total online reactive rating of the plurality of windfarms.

7. The wind turbine generator control system according to claim 6, wherein if at least one of the local windfarm controllers fails to communicate its online reactive rating to the master reactive intra-area controller, then the reactive power command is distributed by the master reactive intra-area controller to the at least one local windfarm controller failing to communicate according to an algorithm whose technical effect is to distribute the total reactive power command based on an assigned configuration constant.

8. The wind turbine generator control system according to claim 5, wherein the the master reactive intra-area controller distributes the total real power command to each of the individual local windfarms according to an algorithm whose technical effect is to distribute the total real power command based on the ratio of an online possible real power rating for the individual local windfarm as received by the master reactive intra-area controller from the local windfarm controller to the total online possible real power rating of the plurality of windfarms.

9. The wind turbine generator control system according to claim 8, wherein if at least one of the local windfarm controllers fails to communicate the online possible real power rating to the master reactive intra-area controller, then the total real power command is distributed by the master reactive intra-area controller to the at least one local windfarm controller failing to communicate according to an algorithm whose technical effect is to distribute the total real power command based on an assigned configuration constant.

10. The wind turbine generator control system according to claim 5, wherein the master reactive intra-area controller further comprises: a closed loop controller adapted to regulate a power-related parameter at a point of common coupling according to a combined voltage reference command including at least one of a voltage reference command and a power factor voltage reference command.

11. The wind turbine generator control system according to claim 10, wherein the at least one of the voltage reference command and a power factor voltage reference command is provided by a system operator for the grid.

12. The wind turbine generator control system according to claim 10, wherein the combined voltage reference command includes a voltage droop signal.

13. The wind turbine generator control system according to claim 10, wherein the combined voltage reference command includes a line drop voltage signal representing the voltage drop in the line between a point of regulation and a point of measurement, permitting control of the power-related system parameter at the point of regulation in the system.

14. The wind turbine generator control system according to claim 10, wherein the closed loop controller generates a total reactive power command in response to a voltage error between the voltage reference and the measured voltage at the point of common coupling.

15. The wind turbine generator control system according to claim 10, wherein an upper and a lower limit are placed on the total reactive power command from the closed-loop controller according to summed maximum reactive power ratings and summed minimum reactive power ratings for the individual local windfarms.

16. The wind turbine generator control system according to claim 5, wherein the master reactive intra-area controller operates as a closed loop controller that regulates voltage at a point of common coupling according to a voltage reference command.

17. The wind turbine generator control system according to claim 5, wherein the master reactive intra-area controller further comprises: a closed loop controller that regulates voltage at a point of common coupling according to a power factor reference command.

18. The wind turbine generator control system according to claim 17, wherein the master reactive intra-area controller further comprises:
a reference signal converter adapted to convert a power factor reference command to a power factor voltage reference command for the closed-loop controller.

19. The wind turbine generator control system according to claim 18, wherein the reference signal converter comprises:
a converter adapted to convert a power factor reference command to a reactive power reference command;
a summer adapted to generating a reactive power error signal;
a proportional-integral-derivative (PID) controller; and
a limiter for the power factor voltage reference command.

20. The wind turbine generator control system according to claim 19, wherein the reactive power error signal further comprises; a line drop compensation, when power factor is being controlled at a point of regulation in the system other than the point of measurement, correcting for real power loss and reactive power loss between the point of measurement and the point of regulation.

21. The wind turbine generator control system according to claim 5, wherein the master reactive intra-area controller further comprises: a closed loop controller adapted to regulate a power-related parameter at a point of common coupling according to a real power reference provided by a system operator for the electric power grid.

22. The wind turbine generator control system according to claim 21, wherein the closed loop controller further regulates real power at a point in the system other than the point of measurement according to a line drop voltage signal representing the real power loss in the line between the point of regulation and the point of measurement on the system.

23. The wind turbine generator control system according to claim 22, wherein the closed loop controller generates a total real power command in response to a difference between the real power reference and a measured real power at the point of measurement.

* * * * *